United States Patent
Ushiyama et al.

(10) Patent No.: US 10,401,821 B2
(45) Date of Patent: Sep. 3, 2019

(54) MOTOR CONTROL DEVICE AND CONTROL METHOD, INFORMATION PROCESSING PROGRAM AND RECORDING MEDIUM

(71) Applicant: OMRON Corporation, Kyoto (JP)

(72) Inventors: Takao Ushiyama, Ritto (JP); Satoshi Yamawaki, Ritto (JP); Masakazu Matsugami, Ritto (JP); Yu Tanaka, Kyoto (JP)

(73) Assignee: OMRON Corporation, Kyoto (JP)

( * ) Notice: Subject to any disclaimer, the term of this patent is extended or adjusted under 35 U.S.C. 154(b) by 243 days.

(21) Appl. No.: 15/382,727

(22) Filed: Dec. 18, 2016

(65) Prior Publication Data

US 2017/0261960 A1    Sep. 14, 2017

(30) Foreign Application Priority Data

Mar. 10, 2016 (JP) ................................ 2016-047564

(51) Int. Cl.
*G05B 19/05* (2006.01)
*G05D 17/02* (2006.01)
*G05B 9/02* (2006.01)

(52) U.S. Cl.
CPC ............. *G05B 19/058* (2013.01); *G05B 9/02* (2013.01); *G05D 17/02* (2013.01); *G05B 2219/14006* (2013.01); *G05B 2219/15052* (2013.01); *G05B 2219/34465* (2013.01)

(58) Field of Classification Search
CPC ............ G05B 9/02; G05B 2219/34465; G05B 2219/15052; G05B 2219/14006; G05D 17/02
See application file for complete search history.

(56) References Cited

U.S. PATENT DOCUMENTS

| 2010/0327667 | A1 | 12/2010 | Fujita et al. |
| 2013/0054724 | A1 | 2/2013 | Yundt et al. |
| 2013/0285589 | A1 | 10/2013 | Sugie et al. |
| 2015/0316621 | A1 | 11/2015 | Ieda et al. |

FOREIGN PATENT DOCUMENTS

| CN | 1267125 | 9/2000 |
| CN | 101937191 | 1/2011 |
| CN | 103324142 | 9/2013 |
| EP | 2199878 | 6/2010 |
| EP | 2367278 | 9/2011 |

(Continued)

OTHER PUBLICATIONS

"Office Action of Japan Counterpart Application", dated Aug. 28, 2018, with English translation thereof, p. 1-p. 5.

(Continued)

*Primary Examiner* — Cuong B Nguyen
(74) *Attorney, Agent, or Firm* — JCIPRNET

(57) ABSTRACT

The invention relates to a motor control device, a control method, an information processing program and a recording medium, even though the network for receiving an output permission signal is not connected, the test run of the motor can be safely performed. Even though a signal generating element (104) of a servo driver (10) does not receive the output permission signal through a field network (30), if the connection to the field network (30) is determined to be not required, the signal generating element (104) does not generate the safety command.

8 Claims, 7 Drawing Sheets

(56) References Cited

FOREIGN PATENT DOCUMENTS

| JP | 2005198891 | 7/2005 |
| JP | 2007072552 | 3/2007 |
| JP | 2011008642 | 1/2011 |
| JP | 2013192414 | 9/2013 |
| JP | 5460930 | 4/2014 |

OTHER PUBLICATIONS

"Search Report of Europe Counterpart Application", dated Jul. 24, 2017, p. 1-p. 8.
"Office Action of China Counterpart Application," dated Dec. 13, 2018, with English translation thereof, p. 1-p. 24.
"Office Action of Europe Counterpart Application", dated Apr. 8, 2019, p1-p5.

MOTOR CONTROL DEVICE AND CONTROL METHOD, INFORMATION PROCESSING PROGRAM AND RECORDING MEDIUM

CROSS-REFERENCE TO RELATED APPLICATION

This application claims the priority benefit of Japanese application serial no. 2016-047564, filed on Mar. 10, 2016. The entirety of the above-mentioned patent application is hereby incorporated by reference herein and made a part of this specification.

BACKGROUND OF THE INVENTION

1. Field of the Invention

The present invention generally relates to a control device for controlling the drive of a motor such as a servo motor.

2. Description of Related Art

In the past, regarding the control system for controlling the drive of a motor such as a servo motor, a control system having a safety function, i.e., STO (Safety Torque Off) function, related to the motor drive is known.

For example, the patent document mentioned below records: a safety unit having the STO function and the servo driver are integrated. Besides, patent document 2 records: a motor drive device is communicated with a circuit anomaly detection device through a network.

EXISTING TECHNICAL DOCUMENTS

Patent Documents

Patent document 1: JP patent publication No. 2013-192414 gazette (published on Sep. 26, 2013)
Patent document 2: JP patent No. 5460930 gazette (registered on Jan. 24, 2014)

SUMMARY OF THE INVENTION

The Problem to be Solved by the Invention

However, the abovementioned conventional servo driver which stops the torque output of the motor under the condition of receiving an output permission signal not through the network has the problem as follows: that is, the test run of the motor cannot be realized if the network is not constructed.

The present invention is finished in view of the problem, and aims to provide a control device, which is a control device for carrying out safety control on the drive of the motor under the condition of receiving the output permission signal not through the network, and the test run of the motor can be safely carried out even if the network is not connected.

Technical Means Solving the Problem

In order to solve the problem, the motor control device of the present invention carries out safety control over the motor according to the output permission signal received by the network, and the motor control device is characterized by comprising: a first interface, configured to being connected to the network; and a control element, controlling the motor based on a control indication received by the network, the control element comprising: a connection determining element, determining whether a connection to the network is required based on specific conditions; a signal generating element, capable of generating a safety command for performing the safety control of the motor based on the fact that whether the output permission signal is received as well as a determining result of the connection determining element; and a safety drive element, carrying out safety control over the motor when acquiring the safety command generated by the signal generating element, wherein the safety command is generated by the signal generating element when the output permission signal is not received and the connection determining element determines that the connection is required, and the safety command is not generated by the signal generating element when the output permission signal is not received and the connection determining element determines that the connection is not required.

According to the structure, the safety drive element carries out safety control over the motor when acquiring the safety command generated by the signal generating element. Herein, the safety command is generated when the signal generating element does not receive the output permission signal and the connection determining element determines that the connection is required, and the safety command is not generated when the output permission signal is not received and the connection determining element determines that the connection is not required. That is, under the condition that the motor control device receives the output permission signal not through the network, the safety control is not carried out on the drive of the motor even if it is determined that the connection to the network is not required.

Therefore, the motor control device has the following effect: even if the device is enabled to be not connected to the network, that is, under the condition of not receiving the output permission signal and determining that the connection to the network is not required, the control can be carried out on the motor based on the control indication. The motor control device for example has the following effect: even if the output permission signal is received not through the network, when it is determined that a user can safely carry out drive of the motor, the control over the test run, etc., of the motor can still be carried out.

Besides, the motor control device can generate the safety command to carry out safety control over the motor if determining that the connection to the network is required under the condition of receiving the output permission signal not through the network.

Therefore, the motor control device has the following effect: under the condition that the output permission signal is received not through the network due to the reasons such as a communication fault, the connection to the network is determined to be required, thereby carrying out control over the motor.

The motor control device of the present invention can be: the connection determining element determines that the connection is not required if no cable is connected to the first interface at a time point that a power source of the device is switched on.

According to the structure, the connection determining element determines that the connection to the network is not required if no cable is connected to the first interface when the first interface is not connected to a cable at a time point that the power source of the device is switched on.

Therefore, the motor control device has the following effect: when the power source of the device is switched on under the condition that the cable is pulled out from the first interface in advance, it is determined that the motor is safely driven since the user does not connect the device to the network consciously instead of the communication fault, etc., such that the control based on the control indication is carried out over the motor.

The motor control device of the present invention can be: the connection determining element determines that the connection is not required when acquiring an information that the user has confirmed that the device is not connected to the network.

According to the structure, the connection determining element determines that the connection to the network is not required when acquiring the information that the user has confirmed no connection to the network.

Therefore, the motor control device has the following effect: under the condition of determining that the information that the user has confirmed no connection to the network is acquired, that is, the motor is safely driven since the user does not connect the device to the network consciously instead of the communication fault, etc., such that the control based on the control indication is carried out over the motor.

The motor control device of the present invention further comprises: a second interface, capable of receiving a stop indication of stopping a torque output of the motor from an external device, the safety drive element carrying out safety control over the motor when acquiring the stop indication through the second interface.

According to the structure, the safety drive element carries out safety control over the motor when acquiring the stop indication stopping the torque output of the motor from the external device through the second interface.

Therefore, the motor control device achieves the following effect: the safety control can be carried out over the motor when the stop indication stopping the torque output of the motor is acquired from the external device through the second interface under the condition that the device is not connected to the network.

The motor control device of the present invention can be: the connection determining element determines that the connection is required when acquiring an information indicating that the first interface accepted to connect to the network is changed from a state of not connecting a cable to a state of connecting the cable.

According to the structure, when acquiring the information indication that the first interface connected to the network is changed to a state of connecting the cable from the state of not connecting the cable, the connection determining element determines that the connection to the network is required.

Therefore, the motor control device has the following effect: under the condition that the state of not connecting to the network is converted to the state of connecting to the network, but the output permission signal is not received, it is possible that the output permission signal cannot be received due to the communication fault, etc., the connection to the network is determined to be required, the safety command is generated to carry out safety control over the motor.

In order to solve the problem, a control method of the present invention is a control method of a motor control device, the motor control device carries out safety control over a motor according to the output permission signal received through the network, and has a first interface configured to connect to the network, and the control method is characterized by comprising: a connection determining step, determining whether a connection to the network is required based on specific conditions; a signal generating step, capable of generating a safety command for performing the safety control of the motor based on the fact that whether the output permission signal is received as well as a determining result in the connection determining step; and a safety drive step, carrying out the safety control over the motor when acquiring the safety command generated in the signal generating step, wherein the safety command is generated in the signal generating step when the output permission signal is not received and the connection is determined to be required in the connection determining step, and the safety command is not generated in the signal generating step when the output permission signal is not received and the connection is determined to be not required in the connection determining step.

According to the method, the safe drive step carries out safe control over the motor when acquiring the safety command generated in the signal generating step. Herein, the safety command is generated when the output permission signal is not received in the signal generating step and the connection is determined to be required in the connection determining step, and the safety command is not generated when the output permission signal is not received and no connection is determined to be required in the connection determining step. That is, the control method does not carry out the safe control over the drive of the motor if determining that the connection to the network is not required even under the condition that the output permission signal is received not through the network.

Therefore, the control method has the following effect: even if the device is enabled to be connected to the network, that is, under the condition of not receiving the output permission signal and determining that the connection to the network is not required, the control can be carried out on the motor based on the control indication. The motor control device for example has the following effect: even if the output permission signal is received not through the network, when it is determined that a user can safely carry out drive of the motor, the control over the test run, etc., of the motor can still be carried out.

Besides, the control method can generate the safety command to carry out safety control over the motor if determining that the connection to the network is required under the condition of receiving the output permission signal not through the network.

Therefore, the motor control device has the following effect: under the condition that the output permission signal is received not through the network due to the reasons such as a communication fault, the connection to the network is determined to be required, thereby carrying out control over the motor.

Effects of the Invention

The present invention has the following effects: regarding the control device carrying out safe control over the drive of the motor under the condition of receiving the output permission signal not through the network, the test run of the motor can be safely carried out even under the condition of no connection to the network.

DESCRIPTION OF THE EMBODIMENTS (Embodiment 1)

Figure 1:
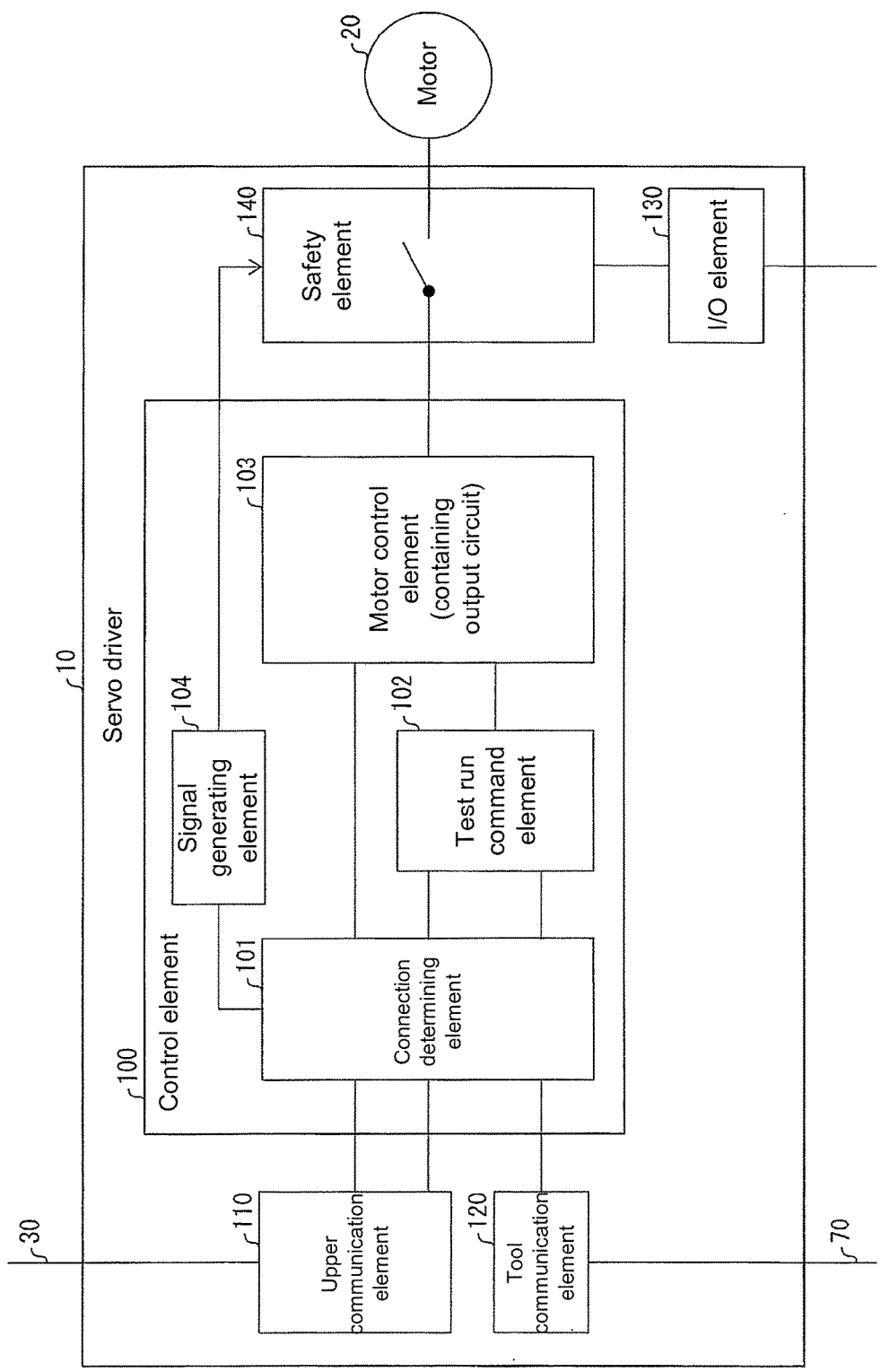
FIG. 1 is a block diagram showing a main element structure of a servo driver of an embodiment 1 of the present invention.
Figure 2:
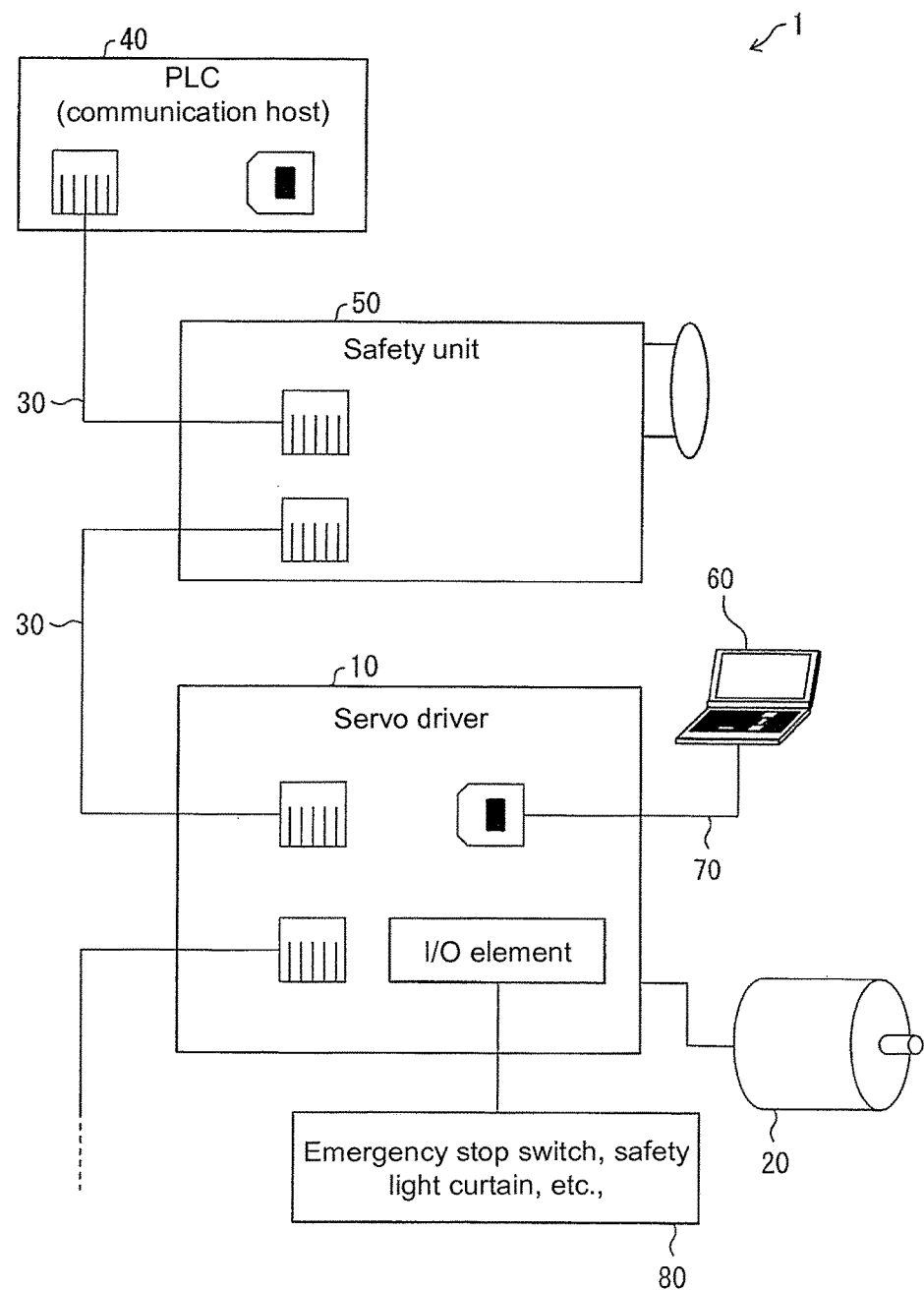
FIG. 2 is a diagram showing an integral generalization of a control system of the present embodiment.

The embodiment 1 of the present invention is explained in detail based on FIGS. 1-8 and Table 1. The same or corresponding elements in the drawings are labelled with the same symbols and its explanation is not repeated any more. In order to conveniently understand the servo driver 10 (motor control device) of the present invention in one form, firstly, FIG. 2 is used to explain the generalization of a control system 1 containing the servo driver 10. In addition, the example that the motor control device of the present invention in one form is the servo driver is used to explain, but the motor control device of the present invention in one form is unnecessarily the servo driver. Even if an inverter is taken as the motor control device of the present invention in one form, the present invention can also be applied.

(Generalization of the Control System of Embodiment 1)

As shown in FIG. 2, the control system 1 contains a motor 20, a PLC (programmable logic controller) 40 outputting a command signal for the drive control of the motor 20, and a servo driver 10 driving the motor 20 according to the command signal from the PLC 40. Besides, the support tool 60 is connected to the servo driver 10, for example, by a communication cable 70 as a USB (Universal Serial Bus) cable.

In the control system 1, a field network 30 for connecting the servo driver 10 and the PLC 40 is connected to a safety unit 50. To be more accurate, the servo driver 10 is connected to the PLC 40 by the field network 30 and the safety unit 50. The servo driver 10 controls the motor 20 to stop torque output of the motor 20 when receiving an output obstruction signal from the safety unit 50 or not receiving the output permission signal.

In addition, the condition that the servo motor 10 controls the motor 20 to stop the torque output of the motor 20 is not limited to the fact that the output obstruction signal from the safety unit 50 is received or the output permission signal is not received. The servo driver 10 only needs to control the motor 20 to stop torque output of the motor 20 when receiving the output obstruction signal through the field network 30 or not receiving the output permission signal.

Besides, the servo driver 10 has an I/O (Input/Output) element 130, when receiving a specified signal (stop signal), the I/O element 130 controls the motor 20 to stop the torque output of the motor 20, For example, the output signal of an abnormality stop switch, or the output signal of a Safety Light Curtain, or the output signal of a safety unit can be used as the specified signal. Besides, the signal expressing that other servo drivers synchronously acting with the servo driver 10 have been stopped can be used as the specified signal.

The PLC 40 is a programmable controller executing a user program for controlling a control device such as the motor 20, and can contain a position control unit, etc. The PLC 40 is formed in a manner of controlling the motor 20, and sends a control indication for the drive control (for example, location control, etc.) of the motor 20 to the servo driver 10 by the field network 30.

The PLC 40, for example, sends a control indication as an execution result of the PLC 40 for the user program to the servo driver 10. Besides, a support tool not shown in the drawing is connected to the PLC 40, to send a control command (control indication) accepted by the support tool and corresponding to the user operation to the servo driver 10 through the field network 30.

Various data received and transmitted between the servo driver 10 and the PLC 40 are transmitted by the field network 30, for example, the control indication as then execution result of the PLC 40 for the user program is transmitted to the servo driver 10 through the field network 30. That is, the field network 30 transmits various data received by the PLC 40 or transmitted by the PLC 40. The field network 30 can use various industrial Ethernets (registered trademark) typically. As the industrial Ethernet (registered trademark), for example, there are known Ether Control Automation Technology (EtherCAT) (registered trademark), Profinet Isochronous Real Time (Profinet IRT), MECHATROLINK (registered trademark)-III, Powerlink, Serial Real Time Communication Specification (SERCOS) (registered trademark)-III, Common Industrial Protocol Motion (CIP Motion), and the like, or any one of them. Further, the field networks except for the Ethernets (registered trademark) can also be used, for example, under the condition without motion control, DeviceNet, CompoNET/Internet Protocol (CompoNet/IP) (registered trademark) and the like can be used. In the control system 1 of the present embodiment, the EtherCAT (registered trademark) typically adopting the industrial Ethernet (registered trademark) is used as the structure of the field network 30 for illustrating.

The servo driver 10 is a control device of the motor 20. The servo driver 10 receives a command value (that is, a control indication as the execution result of the PLC 40 for the user program) from the PLC 40 through the field network 30. Besides, the servo driver 10 can drive the motor 20 according to the command value received through the field network 30 from the PLC 40. For example, the servo driver 10 receives a command value such as a position command value, a speed command value, a torque command value, etc., from the PLC 40 in a fixed period. Besides, the servo driver 10 acquires a measured value such as the position, speed (calculated according to the position of the present time and the position of the last time typically), and torque and related to the action of the motor 20 from a detector such as a position sensor (rotary encoder) and a torque sensor connected to a shaft of the motor 20. Besides, the servo driver 10 sets the command value from the PLC 40 as a target value and uses the measured value as a feedback value for feedback control. That is, the servo driver 10 adjusts a current for driving the motor 20 to enable the measured value to be close to the target value. In addition, the servo driver 10 is also called as a servo motor amplifier sometimes.

The servo driver 10 receives a control command (control indication) corresponding to the user operation accepted by the support tool 60 from the support tool 60. Besides, the servo driver 10 drives the motor 20 according to the control command (control indication) corresponding to the user operation accepted by the support tool 60 and received through the communication cable 70.

In addition, the servo driver 10 can receive the control command (control indication) corresponding to the user operation accepted by the unshown support tool connected to the PLC 40 from the PLC 40. Besides, the servo driver 10 can drive the motor 20 according to the control command (control indication) corresponding to the user operation accepted by the unshown support tool connected to the PLC 40.

The servo driver 10 has a safety function specified in IEC61800-5-2, i.e., an STO function. In the STO function, the power of the motor is obstructed under the condition of receiving an obstruction command (as the STO signal of an output obstruction signal) from the outside.

In the control system 1, under the condition that the STO signal as the output obstruction signal is input to the servo driver 10 through the field network 30, the servo driver 10 stops the torque output of the motor 20 (carries out safety control of the motor 20). Specifically speaking, the servo driver 10 stops the power supply to the motor 20 under the condition that the STO signal is input to the servo driver 10.

Under the condition that the servo driver 10 receives the STO signal as the output permission signal not through the field network 30, when the communication with the field network 30 is determined to be not required, the safety control over the motor 20 is not carried out. Under the condition that the STO signal as the output permission signal is not received not through the field network 30, and when the servo driver 10 determines that the communication with the field network 30 is required, the torque output of the motor 20 is stopped (the safety control over the motor 20 is carried out). Specifically speaking, under the condition that the STO signal is input to the servo driver 10, the servo driver 10 stops the power supply to the motor 20.

The servo driver 10 further stops the torque output of the motor 20 (the safety control over the motor 20 is carried out) under the condition of receiving the stop indication (stop signal) from the abnormality stop switch, the safety light curtain, etc. Specifically speaking, the servo driver 10 receiving the stop indication (stop signal) stops the power supply to the motor 20.

In addition, hereinafter, the STO command when the content of the STO command is "(output) permission" is called as "output permission signal". Besides, hereinafter, the STO command when the content of the STO command is "(output) obstruction" is called as "output obstruction signal".

The safety unit 50 sends the output permission signal to the servo driver 10 under the condition of meeting the specified condition, or generates the STO signal as the output obstruction signal under the condition of not meeting the specified condition and sends the STO signal to the servo driver 10. The safety unit 50 generates the STO signal for example when accepting the user operation for example the user presses down an emergency stop switch in the safety unit 50. Besides, the safety unit 50 also generates the STO signal under the condition of determining that the control of the servo driver 10 over the motor 20 is wrong.

In addition, as abovementioned, the output permission signal/output obstruction signal received by the servo driver 10 through the field signal 30 is not limited to be generated by the safety unit 50. The servo driver 10 controls the motor 20 to stop output torque of the motor 20 as long as receiving the output obstruction signal through the field network or not receiving the output permission signal.

The support tool 60 is an information processing device for setting the information of various parameters for the control system 1. The support tool 60 is connected to the servo driver 10 by the communication cable 70, and sets and adjusts the control parameters stored in the servo driver 10. Besides, the support tool 60 accepts the user operation such as drive of the motor 20 to be controlled. The support tool 60 outputs the control parameters to be set and adjusted and the control command (control indication) corresponding to the user operation accepted by the support tool 60 to the servo driver 10 through the communication cable 70. The servo driver 10 stores the control parameters set and adjusted by the support tool 60 and drives the motor 20 according to the control parameters. The servo driver 10 can also drive the motor 20 according to the control command (control indication) corresponding to the user operation accepted by the support tool 60.

The support tool 60 contains a universal computer typically. For example, the information processing program executed by the support tool 60 can also be stored in an unshown Compact Disk-Read Only Memory (CD-ROM) to be circulated. The program stored in the CD-ROM is read by the unshown CD-ROM drive device and stored to a hard disk, etc., of the support tool 60. Or the constitution can also be that the program is downloaded from an upper host computer, etc., through the network. In addition, in view of the opinion of maintenance, the computer as the support tool 60 is preferably a note type personal computer with excellent portability.

In the control system 1, the servo driver 10 can control the motor 20 according to the control indication corresponding to the user operation accepted by the support tool 60 when determining that the safety control can be carried out on the motor 20 under the condition of receiving the output permission signal not through the field network 30. In order to conveniently understand the safety control of the servo driver 10, the generalization of the safety control (STO function) of the motor control device (conventional servo driver) is explained in advance.

Generally speaking, the conventional servo driver (motor control device) connected to a controller (for example PLC) outputting the control indication for drive control of the motor through the field network monitors the state of safety communication through the field network, and the state becomes the STO state of the safety state under the condition of detecting communication abnormity. The motor is controlled according to the control indication when the conventional servo driver receives the output permission signal from the field network explained in the following text. The field network is configured to communicate with the controller (for example, PLC) outputting the control indication for drive control of the motor. That is, the safety control is carried out always no matter whether the motor can be safely controlled under the condition that the conventional servo driver receives the output permission signal not through the field network. Therefore, the conventional servo driver cannot control the motor for test run, etc., under the condition that the field network is not constructed. The condition is explained in detail as follows.

(Generalization of the Prior Art)

Figure 8:
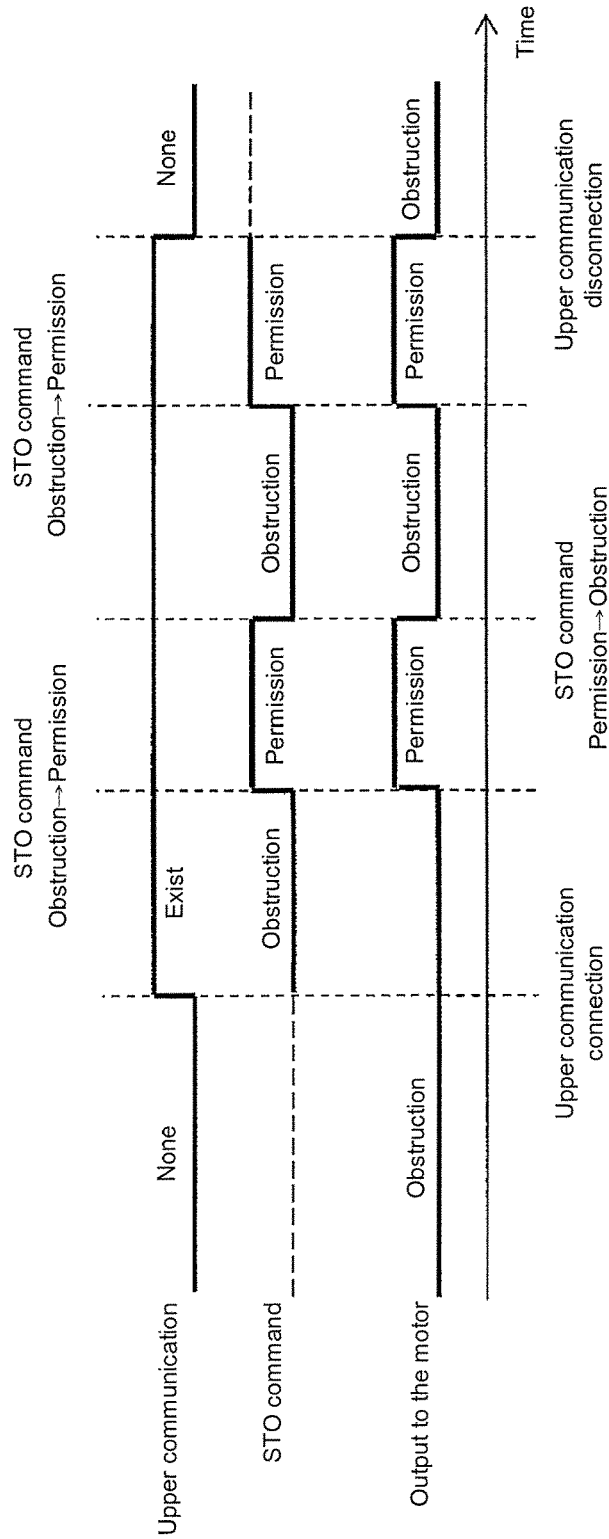
FIG. 8 are diagrams explaining the generalization of an STO function executed by a conventional servo driver.

Table 1 and FIG. 8 are explaining the generalization of an STO function executed by a conventional servo driver. Table 1 indicates: "the conventional servo driver allows the output to the motor under the condition that there is an output permission signal from the safety unit, and obstructs the output to the motor under the conditions except for the condition that there is an output permission signal from the safety unit". In Table 1, "the conditions except for the condition that there is an output permission signal from the safety unit" also contain "the condition of not receiving the output obstruction signal from the safety unit". That is, the conventional servo driver "obstructs the output to the motor" under the "condition of not receiving the output obstruction signal from the safety unit". Therefore, the conventional servo driver obstructs the output to the motor for example under the condition that the conventional servo driver is not connected in the field network connected to the safety unit since the output permission signal is not received from the field network.

TABLE 1

| State | Output to motor |
|---|---|
| there is output permission command | Output permission |
| Except for that | Output obstruction |

FIG. 8 indicates: "the conventional servo driver obstructs the output to the motor (executes safety control) or permits the output (controls the motor according to the control indication) according to the existence of the communication (upper communication) with the field network and the content (obstruction/permission) of the STO command. As shown in 8, the conventional driver obstructs the output to the motor under the condition of "no upper communication", i.e., under the condition that "the conventional servo driver is not connected in the field network connected to the safety unit". Besides, the conventional servo driver obstructs or permits the output to the motor to carry out the safety control according to the content (obstruction/permission) of the STO command under the condition of "the existence of the upper communication", i.e., the condition that "the conventional servo driver is connected in the field network connected to the safety unit".

The Table 1 and FIG. 8 are used to explain the general condition that the motor cannot not be subjected to test run if the conventional servo driver does not construct the safety communication through the field network, and the field network is configured to communicate with the controller outputting a command signal for drive control of the motor. That is, the conventional servo driver cannot control the motor according to the control indication when receiving the output permission signal not through the field network.

For example, under the condition that part of the system constituting the field network instead of the whole field network is only designed and constructed, the conventional servo driver receives the output permission signal not through the field network, and therefore, the motor cannot be controlled according to the control indication.

Relatively, the servo driver 10 can still control the motor 20 for example even under the condition that the output permission signal cannot be received through the field network 30 due to the reasons that the servo driver 10 is not connected to the field network 30 and the like and under the condition that the connection to the field network 30 is not required. The detailed condition is explained as follows.

(About the Servo Driver)

As so far, the generalization of the control system 1 and the devices (servo driver 10, the motor 20, the PLC 40, the safety unit 50 and the support tool 60) contained in the control system 1 is explained by using FIG. 2. Next, regarding the servo driver 10 contained in the control system 1, FIG. 1 is used to explain its structure and processed content, etc.

(Generalization of the Servo Driver)

Before the detailed condition of the servo driver 10 is explained with reference to FIG. 1, in order to conveniently understand the servo driver 10, the generalization of the servo driver 10 is cleared up as the following mentioned.

The motor driver 10 (motor control device) is a motor control device carrying out safety control over the motor 20 according to an STO signal (output permission signal) received through the field network 30 (network), has an upper communication element (110) (first interface) configured to be connected to the field network 30, and a control element 100, controlling the motor 20 based on a control indication received by the field network 30, wherein the control element 100 comprises: a connection determining element 101, determining whether the connection to the field network 30 is required based on specific conditions; a signal generating element 104, generating a safety command for performing the safety control of the motor 20 based on the fact that whether the output permission signal is received as well as a determining result of the connection determining element 101; and a safety element 140 (safety drive element), carrying out safety control over the motor 20 when acquiring the safety command generated by the signal generating element 104, wherein the safety command is generated when the signal generating element 104 does not receive the output permission signal and the connection determining element 101 determines that the connection is required, and the safety command is not generated when the output permission signal is not received and the connection determining element 101 determines that the connection is not required.

According to the structure, the safety element 140 carries out safety control over the motor 20 when acquiring the safety command generated by the signal generating element 104. Herein, the safety command is generated when the signal generating element 104 does not receive the output permission signal and the connection determining element 101 determines that the connection is required, and the safety command is not generated when the output permission signal is not received and the connection determining element 101 determines that the connection is not required. That is, under the condition that the servo driver 10 receives the output permission signal not through the field network 30, the safety control is not carried out on the drive of the motor 20 even if it is determined that the connection to the field network 30 is not required.

Therefore, the servo driver 10 has the following effect: even if the device is enabled to be connected to the field network 30, that is, under the condition of not receiving the output permission signal and determining that the connection to the field network 30 is not required, the control can be carried out on the motor 20 based on the control indication. The servo driver 10 for example has the following effect: even if the output permission signal is received not through the field network 30, when it is determined that a user can safely carry out drive of the motor 20, the control over the test run, etc., of the motor 20 can still be carried out.

Besides, the servo driver 10 can generate the safety command to carry out safety control over the motor 20 if determining that the connection to the field network 30 is required under the condition of receiving the output permission signal not through the field network 30.

Therefore, the servo driver 10 has the following effect: under the condition that the output permission signal is received not through the field network 30 due to the reasons such as a communication fault, the connection to the field network 30 is determined to be required, thereby carrying out control over 20 the motor.

The servo driver 10 of the present invention further comprises: an I/O element 130 (second interface), capable of receiving a stop indication of stopping the torque output of the motor 20 from the external device (for example an abnormality stop switch, a safety light curtain, etc.), the safety element 140 carrying out safety control over the motor 20 when acquiring the stop indication through the I/O element 130.

According to the structure, the safety element 140 carries out safety control over the motor 20 when acquiring the stop indication stopping the torque output of the motor 20 from the external device through the I/O element 130.

Therefore, the servo driver 10 achieves the following effect: the safety control can be carried out over the motor 20 when the stop indication stopping the torque output of the motor 20 is acquired from the external device through the I/O element 130 under the condition that the device is not connected to the field network 30.

The servo driver 10 comprises an I/O element 130, which can receive a stop indication stopping the torque output of the motor 20 from the external device. Besides, acquiring the stop indication through the I/O element 130, the safety element 140 carries out safety control over the motor 20.

That is, the user uses the external device (for example, an emergency stop switch, a safety light curtain, etc.) to send the stop indication stopping the torque output of the motor 20 to the servo driver 10, such that the servo driver 10 carries out safety control over the motor 20.

(Detailed Explaining of the Servo Driver)

The general servo driver 10 is explained as abovementioned, and then the detailed condition of the servo driver 10 is explained by using FIG. 1.

FIG. 1 is a block diagram showing a main element structure of the servo driver 10. The servo driver 10 as shown in FIG. 1 is a structure including a control element 100, an upper communication element 110, a tool communication element 120, an I/O element 130 and a safety element 140.

The upper communication element 110 communicates with the PLC 40 by the field network 30. The upper communication element 110 receives a control indication of the servo driver 10 for controlling the motor 20 through the field network 30 from the PLC 40. For example, the upper communication element 100 receives a control indication as an execution result of the PLC 40 for a user program from the PLC 40 through the field network 30. Besides, the upper communication element 110 can receive the control indication corresponding to the user operation accepted by an unshown support tool connected to the PLC 40 from the PLC 40 through the field network 30.

The upper communication element 110 receives the output permission signal or an output obstruction signal of the servo driver 10 for the safety control of the motor 20 from the safety unit 50 through the field network 30. Besides, as abovementioned, the output permission signal and output obstruction signal received by the upper communication element 110 through the field network 30 may be not generated by the safety unit 50. The upper communication element 110 only needs to receive the output permission signal or the output obstruction signal by the field network 30.

The upper communication element 110 outputs the control indication received from the PLC 40 through the field network 30 and the output permission signal or output obstruction signal received from the safety unit through the field network 30 to the connection determining element 101.

The tool communication element 120 communicates with the support tool 60 through a communication cable 70. The tool communication element 120 receives the control indication corresponding to the user operation accepted by the support tool 60 from the support tool 60 through the communication cable 70. The tool communication element 120 outputs the control indication corresponding to the user operation accepted by the support tool 60 from the support tool 60 through the communication cable 70 to the connection determining element 101.

The I/O element 130 receives the stop indication (stop signal) from the abnormality stop switch, the safety light curtain, etc. Besides, the I/O element 130 receives the signal indicating the drive state of other motors (not shown). The I/O element 130 outputs the received stop indication (stop signal) to the safety element 140.

The safety element 140 carries out safety control over the motor 20 when acquiring the safety command generated by the signal generating element 104. Besides, the safety element 140 carries out the safety control over the motor 20 when acquiring the stop indication (stop signal) received by the I/O element 130.

The control element 100 carries uniform control over the functions of the servo driver 10. In the shown control element 100, a function block comprises a connection determining element 101, a test run command element 102, a motor control element 103 and a signal generating element 104.

The connection determining element 101 determines whether the upper communication element 110 communicates with the field network 30 (for example, whether the upper communication element 110 is connected to a cable for communicating with the field network 30). Besides, the connection determining element 101 determines whether an output permission signal or output obstruction signal is received through the field network 30, and determines which one is received (which one of the output permission signal and the output obstruction signal is received) under the condition that the output permission signal or output obstruction signal has been received.

The connection determining element 101 determines whether the connection to the field network (30) is required based on specified conditions. Herein, the so called "specific conditions" used for the connection determining element 101 to determine whether the connection to the field network (30) is required, for example, is "the existence of the user confirmation related to the fact whether the connection is required", "the existence of a relation between the connection with the field network 30 and a power source of the device", "conversion of the connecting state of the field network 30", etc., and the detailed condition is mentioned as follows.

The connection determining element 101 acquires the control indication received by the upper communication element 110 from the PLC 40 through the field network 30 from the upper communication element 110, and acquires the control indication received by the tool communication element 120 from the support tool 60 through the communication cable 70 from the tool communication element 120.

The connection determining element 101 outputs the control indication and the determining result (a determining result related to the fact "whether the output permission signal or output obstruction signal is received", a determining result related to the fact "whether the connection to the field network 30 is required", etc.) to the test run command element 102, the motor control element 103 and the signal generating element 104.

Specifically speaking, the connection determining element 101 outputs the control indication received by the upper communication element 110 from the PLC 40 through the field network 30 to the motor control element 103. Besides, the connection determining element 101 outputs the control indication received by the tool communication element 120 from the support tool 60 through the communication cable 70 to the test run command element 102. Further, the connection determining element 101 outputs the control indication corresponding to the user operation accepted by the unshown support tool connected to the PCL40 to the test run command element 102.

Further, the connection determining element 101 outputs the output permission signal or output obstruction signal received from the safety unit 50 through the field network 30 to the signal generating element 104.

The test run command element 102 acquires the control indication from the support tool 60 from the connection determining element 101. Besides, the test run command element 102 can also acquire the control indication corresponding to the user operation accepted by the unshown support tool connected to the PLC 40 from the connection determining element 101. The test run command element 102 converts the control indication acquired by the connection determining element 101 into a signal capable of being processed by the motor control element 103 and outputs to the motor control element 103.

The motor control element 103 receives the control indication from the PLC 40 from the connection determining element 101. That is, the motor control element 103 receives the control indication (i.e., the control indication as an execution result of the PLC 40 for a user program) from the PLC 40 through the field network 30. Besides, the motor control element 103 controls the motor 20 based on the control indication from the PLC 40.

Besides, the motor control element 103 receives the control indication (to be more accurately speaking, the control indication converted by the test run command element 102) from the support tool 60 from the test run command element 102. The motor control element 103 also receives the control indication (to be more accurately speaking, the control indication converted by the test run command element 102) corresponding to the user operation accepted by the unshown support tool connected to the PLC 40 from the test run command element 102. Besides, the motor control element 103 controls the motor 20 based on the control indication (for example, the control indication converted by the test run command element 102 and coming from the support tool 60) acquired from the test run command element 102. In addition, as abovementioned, the motor control element 103 can also control the motor 20 based on the control indication (to be more accurately speaking, the control indication converted by the test run command element 102) corresponding to the user operation accepted by the unshown support tool connected to the PLC 40.

The signal generator element 104 generates the safety command for controlling the safety control of the motor 20 or not based on the fact whether the output permission signal is received as well as the determining result of the connection determining element 101. Specifically speaking, the signal generating element 104 generates no safety command under the condition of receiving the output permission signal. The signal generating element 104 generates the safety command under the condition of receiving the output obstruction signal. The signal generating element 104 generates the safety command when the output permission signal is not received and the connection determining element 101 determines that the connection is required. The signal generating element 104 generates no safety command when the output permission signal is not received and the connection determining element 101 determines that the connection is not required. When generating the safety command, the signal generating element 104 outputs the generated safety command to the safety element 140.

Regarding the servo driver 10 of which the structure generalization is explained, the processing (whether the determining processing on the fact whether the connection is required) executed in the servo driver 10 is explained next.

(About the Generalization of the Connection Determining Processing)

Figure 3:
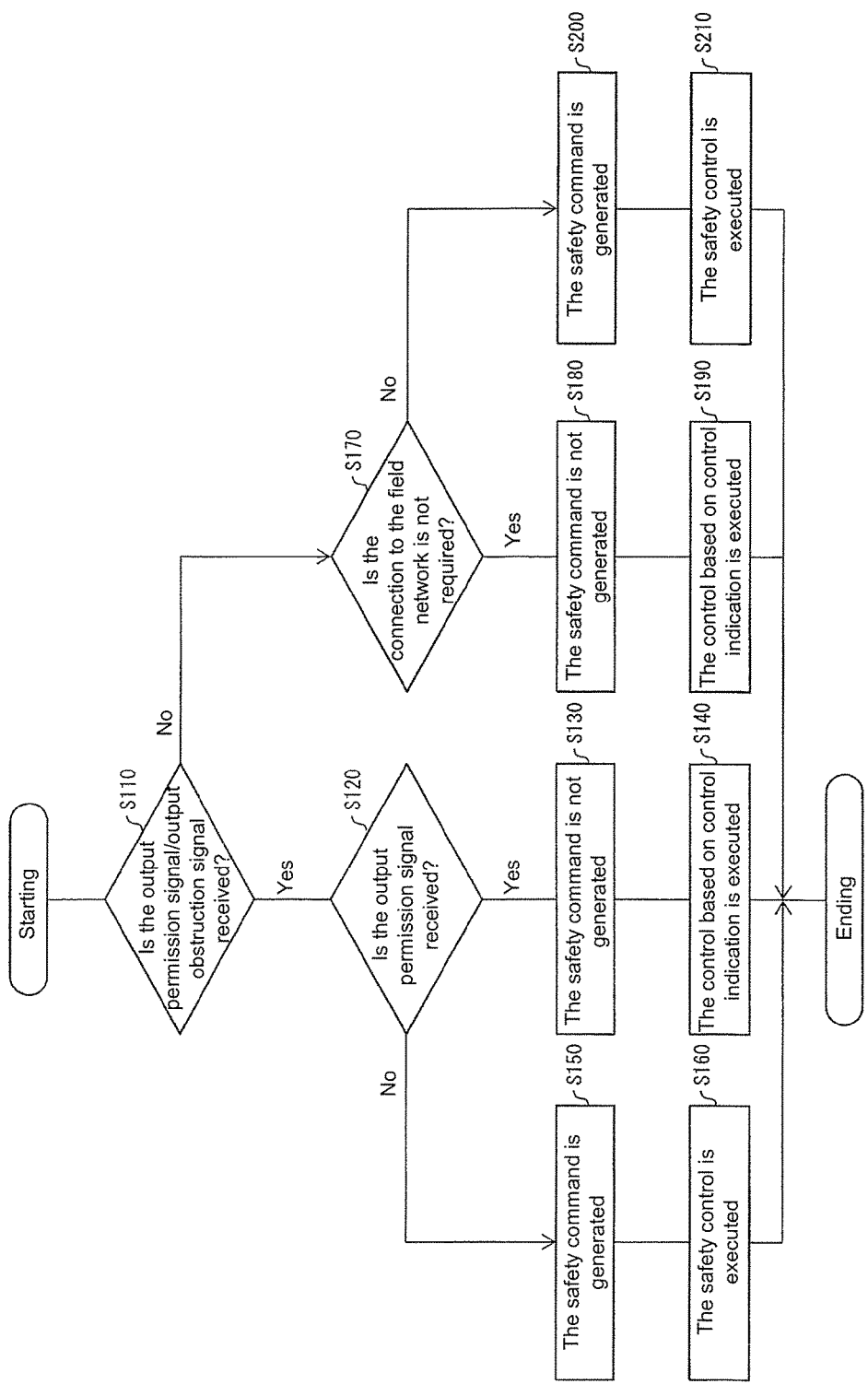
FIG. 3 is a flow chart showing a generalization of connection determining processing executed by the servo driver in FIG. 1.

Before the processing (whether the determining processing on the fact whether the connection is required) executed in the servo driver 10 is explained in detail, FIG. 3 is used to explain the generalization of the processing executed by the servo driver 10.

FIG. 3 is a flow chart showing a generalization of connection determining processing executed by the servo driver 10.

At first, the connection determining element 101 determines whether the output permission signal or output obstruction signal is received (S110). The connection determining element 101 then determines whether the output permission signal is received (S120) under the condition that the output permission signal or output obstruction signal is received (Yes in S110).

Under the condition that the output permission signal is received (yes in S120), the signal generating element 104 does not generate the safety command (S130), and the motor control element 103 controls the motor 20 based on the control indication from the support tool 60, i.e., executes the control based on the control indication (S140).

Under the condition that the output permission signal is received yet the output obstruction signal is not received (No in S120), the signal generating element 104 generates the safety command (S150), and the safety element 140 acquires the safety command generated by the signal generating element 104 to carry out safety control over the motor 20. That is, the servo driver 10 executes safety control (S160).

Under the condition that the output permission signal or output obstruction signal is not received (no in S110), the connection determining element 101 determines whether the connection to the field network (30) is required (S170). Under the condition that the connection determining element 101 determines that the connection to the field network 30 is not required (yes in S170), the signal generating element 104 does not generate the safety command (S180), the motor control element 103 controls the motor 20 based on the control indication from the support tool 60, i.e., executes the control based on the control indication (S190).

Under the condition that the connection determining element 101 determines that the connection to the field network 30 is not required (no in S170), the signal generating element 104 generates a safety command (S200), and the safety element 140 acquires the safety command generated by the signal generating element 104 to carry out safety control over the motor 20. That is, the servo driver 10 executes safety control (S210).

The processing executed by the servo driver 10 and explained by FIG. 3 is generalized as follows. That is, the processing executed by the servo driver 10 is a control method of the servo driver 10, the servo driver 10 is a motor control device carrying out safety control over the motor 20 according to the output permission signal received through the network, and has an upper communication element 110 (first interface) connected to the field network (30), and the control method is characterized by comprising: a connection determining step (S170), determining whether the connection to the field network 30 is required based on specific conditions; a signal generating step (S180/S200), generating a safety command for performing the safety control of the motor 20 based on the fact that whether the output permission signal is received as well as a determining result in the connection determining step; and a safety drive step (S210), carrying out safety control over the motor 20 when acquiring the safety command generated in the signal generating step, wherein the safety command is generated (S200) when the output permission signal is not received in the signal generating step (S180/S200) and the connection is determined to be required in the connection determining step, and the safety command is not generated (S180) when the output permission signal is not received and no connection is determined to be required in the connection determining step.

According to the method, the safe drive step carries out safe control over the motor 20 when acquiring the safety command generated in the signal generating step. Herein, the safety command is generated when the output permission signal is not received in the signal generating step and the connection is determined to be required in the connection determining step, and the safety command is not generated when the output permission signal is not received and no connection is determined to be required in the connection determining step. That is, the control method does not carry out the safe control over the drive of the motor 20 if determining that the connection to the field network 30 is not required even under the condition that the output permission signal is received not through the field network 30.

Therefore, the control method has the following effect: even if the device is enabled to be connected to the field network 30, that is, under the condition of not receiving the output permission signal and determining that the connection to the field network 30 is not required, the control can be carried out on the motor 20 based on the control indication. The control method for example has the following effect: even if the output permission signal is received not through the field network 30, when it is determined that a user can safely carry out drive of the motor 20, the control over the test run, etc., of the motor 20 can still be carried out.

Besides, the control method can generate the safety command to carry out safety control over the motor 20 if determining that the connection to the field network 30 is required under the condition of receiving the output permission signal not through the field network 30.

Therefore, the control method 10 has the following effect: under the condition that the output permission signal is received not through the field network 30 due to the reasons such as a communication fault, the connection to the field network 30 is determined to be required, thereby carrying out control over the motor 20.

(Determining Factor of the Fact Whether the Connection is Required)

Figure 4:
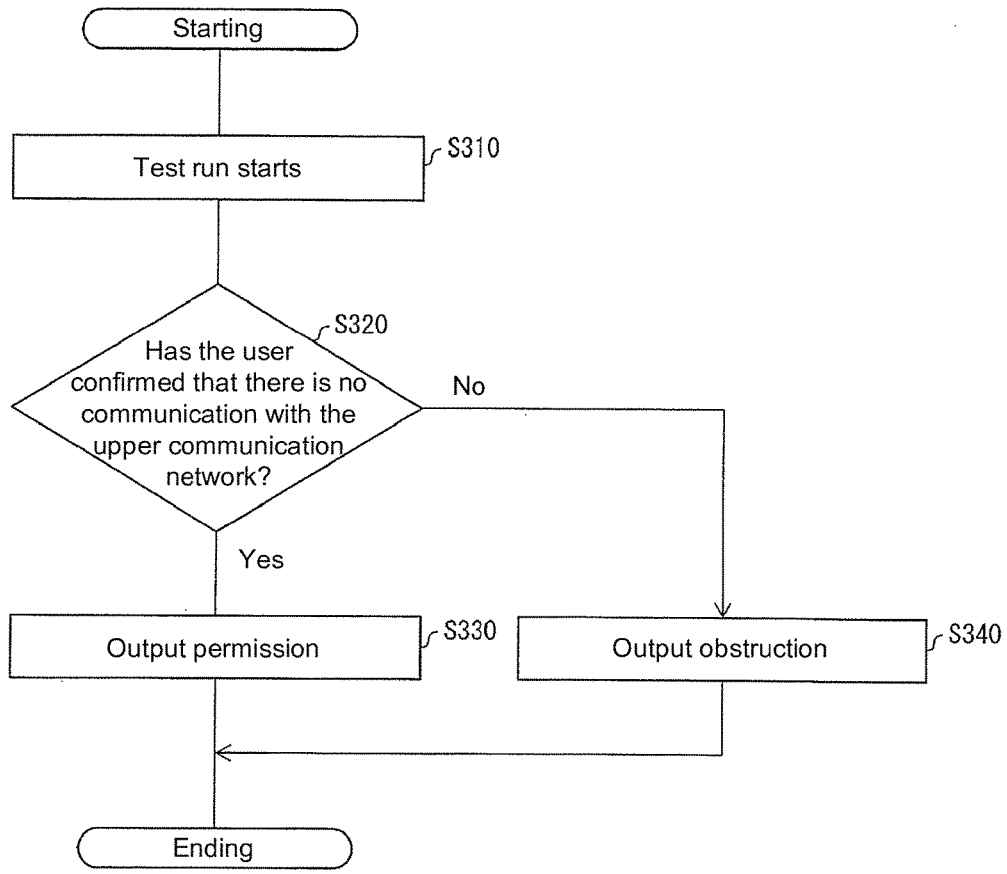
FIG. 4 is a flow chart of one example of the connection determining processing executed by the servo driver in FIG. 1 during test run.

FIG. 4 is a flow chart of one example of the connection determining processing executed by the servo driver 10 during test run. In addition, in FIG. 4, the so called "during test run" is a time point (state) when the field network 30 is not constructed. Usually, "during test run", the upper communication element 110 (first interface) is not connected to a cable for communicating with the field network 30. That is, "during test run", the output permission signal is received no through the field network 30.

As shown in FIG. 4, under the condition that the servo driver 10 is about to start the test run of the motor 20, to be more accurate, under the condition that the servo driver does not receive the output permission signal, and under the condition that support tool 60 accepts the user operation that the motor 20 is to test run, the servo driver 10 executes the following determining. That is, the connection determining element 101 confirms "whether the user has confirmed that there is no communication with the field network (30) (upper communication network)" (S320).

When the connection determining element 101 confirms "the user has confirmed that there is no communication with the field network 30 (upper communication network) (yes in S320)", the connection determining element 101 determines that "the connection is not required (the communication with the field network 30 is not required)". Besides, the signal generating element 104, as abovementioned, does not generate the safety command since "the output permission signal is not received and the connection determining element 101 determines that the connection is not required". Therefore, the servo driver 10 executes output permission, that is, controls the motor 20 (S330) based on the control command from the support tool 60.

Under the condition that the connection determining element 101 cannot confirm "whether the user has confirmed that there is no communication with the field network 30 (upper communication network)" (no in S320), the connection determining element 101 determines that "the connection is required (the communication with the field network 30 is required)". Besides, the signal generating element 104, as abovementioned, generates the safety command since "the output permission signal is not received and the connection determining element 101 determines that the connection is required", the safety element 140 acquires the safety command generated by the signal generating element 104 to carry out safety control over the motor 20. That is, the servo driver 10 executes output obstruction to carry out safety control over the motor 20 (S340).

Figure 5:
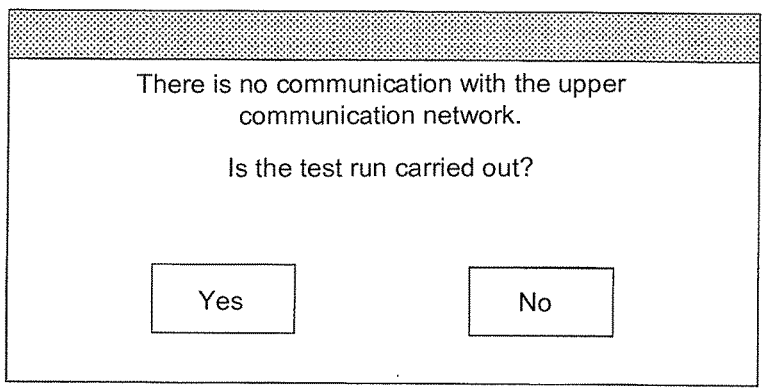
FIG. 5 is a diagram showing an example of information allowed by the servo drive in FIG. 1 to be confirmed by a user in order to safe test run control.

FIG. 5 is a diagram showing an example of information allowed by the servo drive 10 to be confirmed by a user in order to safe test run control. The connection determining element displays "no communication with the upper communication network, whether the test run is carried out" as shown in FIG. 5 to inquire whether a user has confirmed that there is no communication with the upper communication network. Besides, the connection determining element 101 determines that the connection is not required when acquiring the information indicating that the user has confirmed that the device is not connected to the field network 30. For example in FIG. 5, when the connection determining element 101 acquires the information that the user has selected yes, the connection determining element 101 determines that the connection is not required. At this point, the signal generating element 104, as abovementioned, does not generate the safety command since "the output permission signal is not received and the connection determining element 101 determines that the connection is not required". Therefore, the servo driver 10 can execute output permission under the condition that the output permission signal is received not through the field network 30, that is, can control the motor 20 based on the control indication from the support tool 60.

As abovementioned, in the servo driver 10, when acquiring the information indicating that the user has confirmed that the device is not connected to the field network 30, the connection determining element 101 determines that the connection is not required.

According to the structure, when acquiring that the information indicating that the user has confirmed no connection to the field network 30, the connection determining element 101 determines that the connection to the field network 30 is not required.

Therefore, the servo driver 10 achieves the following effect: under the condition that the information that the user has confirmed no connection to the field network 30 is acquired, that is, under the condition that the motor 20 is safely driven since the user does not connect the device to the field network 30 consciously instead of the communication fault, etc., the control can be carried out on the motor 20 based on the control indication.

(A Determining Moment about Whether the Connection is Required)

Figure 6:
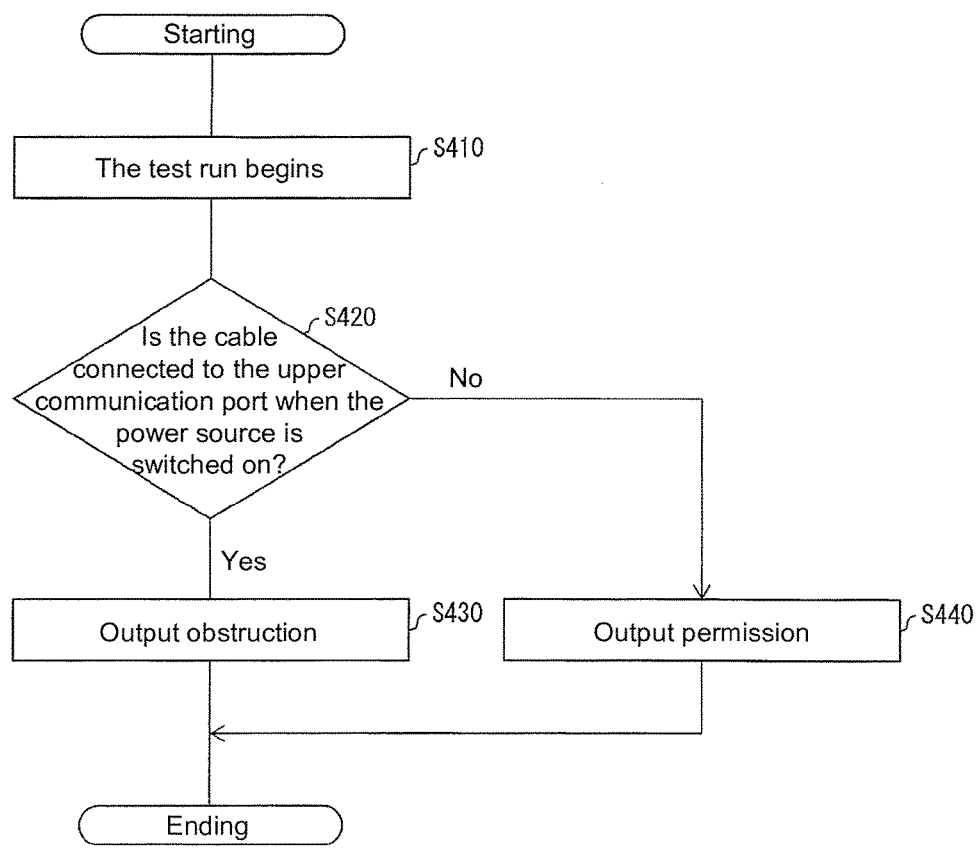
FIG. 6 is a flow chart showing one example of the connection determining processing executed by the servo driver in FIG. 1 and different from that as shown in FIG. 4 during test run.

FIG. 6 is a flow chart showing one example of the connection determining processing executed by the servo driver 10 and different from that as shown in FIG. 4 during test run. In addition, same as FIG. 4, in FIG. 6, the so called "during test run" is a time point (state) when the field network 30 is not constructed. Usually, "during test run", the upper communication element 110 (first interface) is not connected to the cable communicating with the field network 30. That is, "during test run", the output permission signal is received not through the field network 30.

As shown in FIG. 6, under the condition that the test run of the motor 20 is about to start (S410), to be more accurate, under the state that the servo driver 10 does not receive the output permission signal, and under the condition that the support tool 60 accepts the user operation that the motor 20 is about to be subjected to test run, the servo driver 10 executes the following determining.

That is, the connection determining element 101 confirms that "when the power source of the servo driver 10 is switched on, whether the cable for communication with the field network 30 is connected to the upper communication element 110 (upper communication port) (whether cable connection exists)" (S420).

When the connection determining element 101 confirms that "when the power source is switched on, the cable is connected to the upper communication element 110" (yes in S420), the connection determining element 101 determines that "the connection is required". Besides, the signal generating element 104, as abovementioned, generates the safety command since "the output permission signal is not received and the connection determining element 101 determines that the connection is required", the safety element 140 acquires the safety command generated by the signal generating element 104 to carry out safety control over the motor 20. That is, the servo driver 10 executes output obstruction and carries out safety control over the motor 20 (S430).

When the connection determining element 101 confirms that "when the power source is switched on, and the no cable is connected to the upper communication element 110", the connection determining element 101 determines that the "connection is required". Besides, the signal generating element 104, as abovementioned, generates the safety command since "the output permission signal is not received and the connection determining element 101 determines that the connection is required", and the safety element 140 acquires the safety command generated by the signal generating element 104 to carry out safety control over the motor 20.

That is, the servo driver 10 executes output obstruction, and carries out safety control over the motor 20 (S430).

When the connection determining element 101 confirms that "when the power source is switched on, no cable is connected to the upper communication element 110" (no in S420), the connection determining element 101 determines that "the connection is not required". Besides, the signal generating element 104, as abovementioned, does not generate the safety command since "the output permission signal is not received and the connection determining element 101 determines that the connection is not required". Therefore, the servo driver 10 executes output permission, that is, the motor 20 is controlled based on the control indication from the support tool 60 (S440).

As abovementioned, in the servo driver 10, the connection determining element 101 determines that the connection is not required if no cable is connected to the upper communication element 110 (first interface) at a time point that a power source of the device is switched on.

According to the structure as mentioned, the connection determining element 101 determines that the connection to the field network 30 is not required if no cable is connected to the upper communication element 110 at a time point that a power source of the device is switched on.

Therefore, the servo driver 10 has the following effect: when the power source of the device is switched on under the condition that the cable is pulled out from the upper communication element 110 in advance, it is determined that the motor is safely driven since the user does not connect the device to the field network 30 consciously instead of the communication fault, etc., such that the control based on the control indication is carried out over the motor 20.

For example, when detecting that the cable of the field network 30 is not connected to the upper communication element 110 at the time point that the power source is switched on, the servo driver 10 determines that the motor 20 is safely driven (for example, the motor is enabled to be subjected to test run) since the user does not connect the device to the field network 30 consciously. Therefore, the servo driver 10 determines that the connection to the upper communication element 110 is not required, and the test run of the motor 20 can be carried out by using the support tool 60.

(About the Relation Between the Change of the Connection State of the Network and the Determining Result)

In the servo driver 10, the connection determining element 101 determines that the connection is required when acquiring the information indicating that the upper communication element 110 (first interface) connected to the field network 30 is changed to a state of connecting the cable from the state of not connecting the cable.

According to the structure, the connection determining element 101 determines that the connection to the field network 30 is required when acquiring the information indicating that the upper communication element 110 is changed to a state of not connecting the cable from the state of connecting the cable.

Therefore, the servo driver 10 has the following effect: under the condition that the state of not connecting to the field network 30 is converted to the state of connecting to the field network 30, but the output permission signal is not received, it is possible that the output permission signal cannot be received due to the communication fault, etc., the connection to the field network 30 is determined to be required, the safety command is generated to carry out safety control over the motor 20. For example, when the servo driver 10 detects that the upper communication element 110 connected to the field network 30 is changed to a state of connecting the cable from the state of not connecting the cable.

(Embodiment by Means of Software)

Figure 7:
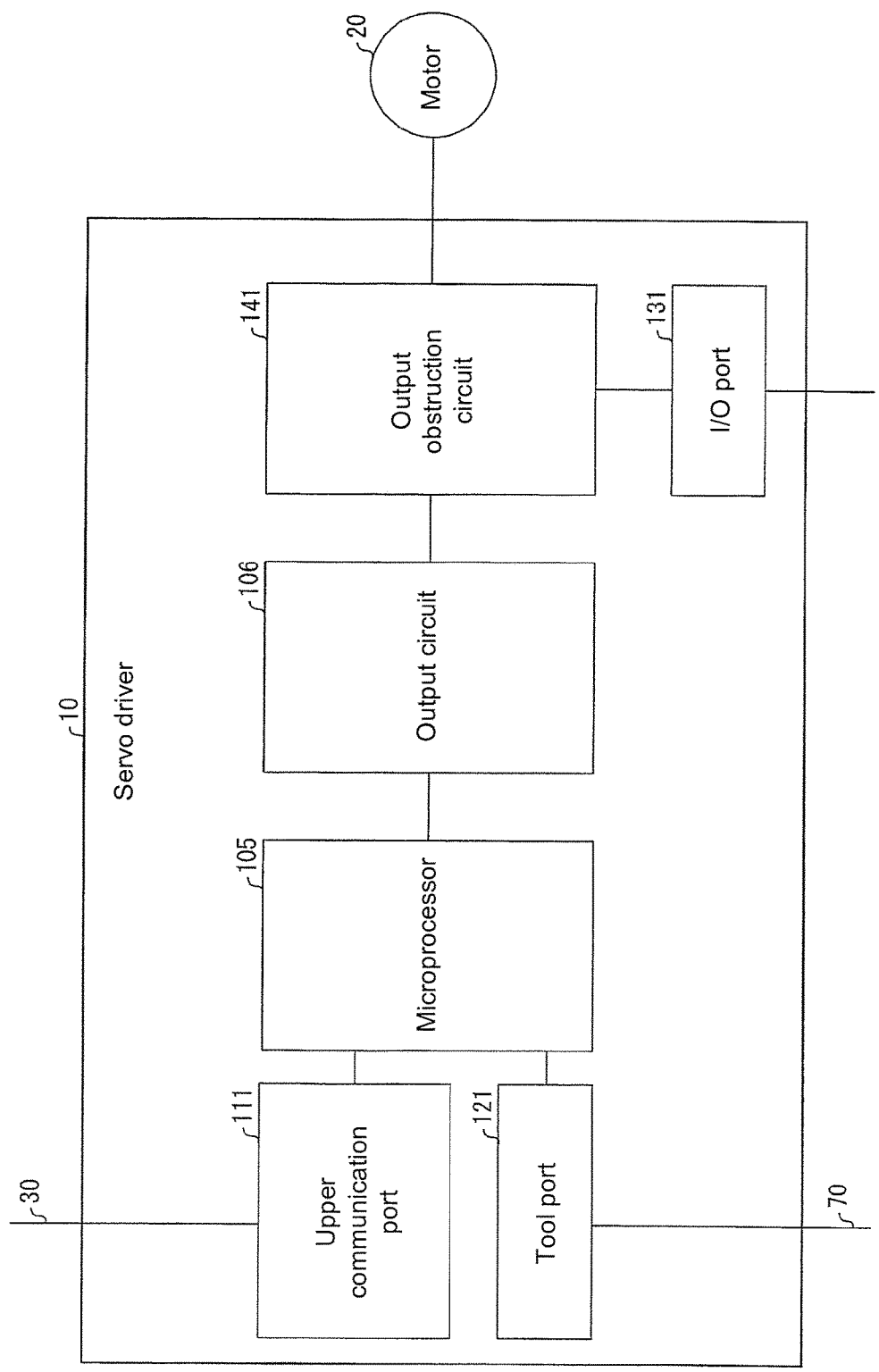
FIG. 7 is a block diagram illustrating the main element structure of a computer used as the servo driver as in FIG. 1.

FIG. 7 is a block diagram illustrating the main element structure of a computer used as the servo driver 10.

The control element 100 (especially, the connection determining element, the test run command element 102, the motor control element 103 and the signal generating element 104) can be realized by a logic circuit (hardware) formed on an integrated circuit (IC) chip, and can also be realized by software by using a Central Processing Unit (CPU).

For example, the connection determining element 101, the test run command element 102 and the signal generating element 104 in the control element 100 can be realized by a microprocessor 105 as shown in FIG. 7. Similarly, the motor control element 103 in the control element 100 can be realized by an output circuit 106 as shown in FIG. 7.

Besides, the safe element 140 of the servo driver 10 can be realized by an output obstruction circuit 141 as shown in FIG. 7. When acquiring the safety command generated by the signal generating element 104 (microprocessor 105), the output obstruction circuit 141 obstructs the power supply to the motor 20 to stop the torque output to the motor 20. In the other aspect, under the condition of not acquiring the safety command from the microprocessor 105, the output obstruction circuit 141 does not obstruct the signal (power supply) of the motor 20.

Under the condition that the control element 100 is realized by software, the servo driver 10 has a CPU (or microprocessor 105 and output circuit 106) having the software realizing each function, i.e., the command of the program, an ROM (Read Only Memory) or storage device (or called as recording medium) capable of read by the computer (or microprocessor 105 and output circuit 106) and recording the program and various data, and an RAM (Random Access Memory) developing the program, etc. The program is read and executed by the computer (or CPU or microprocessor 105 and output circuit 106) to achieve the purpose of the present invention. As the recording medium, "an non-temporary visible medium" can be used, for example, a tape, a disk, a card, a semiconductor memory, a programmable logic circuit, etc., can be used. Besides, the program can be provided for the computer through any transmission medium (communication network or broadcast waves, etc.) capable of transmitting the program.

Besides, the communication element 10 of the servo driver 10 can also be realized by an upper communication port 111. The upper communication element 110 for example contains: a field bus control element, managing data transmission through the field network 30; a field bus receiving element, receiving upper communication frames sent from the PLC 40 through the field network 30, decoding into data and outputting to the field bus control element; and a field bus sending element, regenerating the data output from the field bus control element into the upper communication frames again, and resending (forwarding) through the field network 30. The field bus control element, the field bus receiving element and the field bus sending element receive and transmit data with the PLC 40 through the field network 30 in each predetermined control period.

Further, the tool communication element 120 of the servo driver 10 can be realized by a tool port 121. The tool port 121 for example is a USB connector, and is an interface for connecting the servo driver 10 with the support tool 60. Typically, the control command (control indication) from the support tool 60 is guided into the servo driver 10 through the USB connector, i.e., the tool communication element 120, and is executed by the microprocessor 105 and the output circuit 106.

Similarly, the I/O element of the servo driver 10 can also be realized by an I/O port 131. The I/O port 131 for example can be a universal I/O port.

The present invention is not limited to the mentioned respective embodiments, and can be altered in the range shown by the claims, and the embodiments obtained by suitably combining the technical elements respectively disclosed in different embodiments also fall within the technical scope of the present invention.

What is claimed is:

1. A motor control device, carrying out safety control over a motor according to an output permission signal received through a network, and characterized by comprising:
   a first interface, configured to being connected to the network; and
   a control element, controlling the motor based on a control indication received by the network,
   the control element comprising:
   a connection determining element, determining whether a connection to the network is required based on specific conditions;
   a signal generating element, generating a safety command for performing the safety control of the motor based on the fact that whether the output permission signal is received as well as a determining result of the connection determining element; and
   a safety drive element, carrying out safety control over the motor when acquiring the safety command generated by the signal generating element,
   wherein the safety command is generated by the signal generating element when the output permission signal is not received and the connection determining element determines that the connection is required, and
   the safety command is not generated by the signal generating element when the output permission signal is not received and the connection determining element determines that the connection is not required.

2. The motor control device according to claim 1, characterized in that,
   the connection determining element determines that the connection is not required if no cable is connected to the first interface at a time point that a power source of the device is switched on.

3. The motor control device according to claim 1, characterized in that,
   the connection determining element determines that the connection is not required when acquiring an information that the user has confirmed that the device is not connected to the network.

4. The motor control device according to claim 1, characterized by further comprising,
   a second interface, receiving a stop indication of stopping a torque output of the motor from an external device,
   the safety drive element carrying out safety control over the motor when acquiring the stop indication through the second interface.

5. The motor control device according to claim 1, characterized in that,
   the connection determining element determines that the connection is required when acquiring an information indicating that the first interface accepted to connect to the network is changed from a state of not connecting a cable to a state of connecting the cable.

6. A control method, being a control method of a motor control device, the motor control device carrying out safety control over a motor according to an output permission signal received through a network, and having a first interface configured to connect to the network, wherein the control method is characterized by comprising:
- a connection determining step, determining whether a connection to the network is required based on specific conditions;
- a signal generating step, generating a safety command for performing the safety control of the motor based on the fact that whether the output permission signal is received as well as a determining result in the connection determining step; and
- a safety drive step, carrying out the safety control over the motor when acquiring the safety command generated in the signal generating step, wherein the safety command is generated in the signal generating step when the output permission signal is not received and the connection is determined to be required in the connection determining step, and the safety command is not generated in the signal generating step when the output permission signal is not received and the connection is determined to be not required in the connection determining step.

7. An information processing program, configured to take a computer as the motor control device according to claim 1 to exert functions, and characterized by being configured to take the computer as each of the elements to exert the functions.

8. A recording medium, characterized by recording the information processing program according to claim 7 and being computer-readable.

* * * * *